(12) United States Patent
Jiang et al.

(10) Patent No.: US 11,567,789 B2
(45) Date of Patent: Jan. 31, 2023

(54) RECOMMENDATIONS FOR USER INTERFACE ACTIONS

(71) Applicant: International Business Machines Corporation, Armonk, NY (US)

(72) Inventors: Ming Zhe Jiang, Beijing (CN); Jiao Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/105,934

(22) Filed: Nov. 27, 2020

(65) Prior Publication Data
US 2022/0171640 A1    Jun. 2, 2022

(51) Int. Cl.
    *G06F 17/15*     (2006.01)
    *G06F 9/451*     (2018.01)
    *G06F 9/54*     (2006.01)

(52) U.S. Cl.
CPC ............. *G06F 9/453* (2018.02); *G06F 9/543* (2013.01); *G06F 17/15* (2013.01)

(58) Field of Classification Search
CPC ........... G06F 9/453; G06F 17/15; G06F 9/543
See application file for complete search history.

(56) References Cited

U.S. PATENT DOCUMENTS

| | | |
|---|---|---|
| 7,502,785 B2 | 3/2009 | Chen et al. |
| 8,756,520 B2 | 6/2014 | Haynes et al. |
| 2002/0035581 A1 | 3/2002 | Reynar et al. |
| 2003/0004957 A1 | 1/2003 | Broman et al. |
| 2007/0035745 A1 | 2/2007 | Izumi et al. |
| 2008/0028442 A1 | 1/2008 | Kaza et al. |
| 2009/0300522 A1 | 12/2009 | Haynes et al. |
| 2018/0004710 A1* | 1/2018 | Wu .................. G06Q 10/10 |
| 2018/0300917 A1* | 10/2018 | Barnett ............. H04N 5/23293 |
| 2019/0079946 A1 | 3/2019 | Li et al. |
| 2020/0092611 A1* | 3/2020 | Sokolov ........... H04N 21/4756 |
| 2020/0110754 A1* | 4/2020 | Lamburt .............. G06F 16/435 |
| 2020/0110783 A1* | 4/2020 | Ushanov ................ G06N 3/04 |
| 2021/0117714 A1* | 4/2021 | Yang ................ G06K 9/00483 |
| 2021/0142478 A1* | 5/2021 | Abhinav ............... G06N 20/00 |

(Continued)

FOREIGN PATENT DOCUMENTS

CN     105511862 A     4/2016

OTHER PUBLICATIONS

Mell et al., "The NIST Definition of Cloud Computing Recommendations," Recommendations of the National Institute of Standards and Technology, U.S. Department of Commerce, Special Publication 800-145, Sep. 2011, 7 pages.

(Continued)

*Primary Examiner* — Kyle R Stork
(74) *Attorney, Agent, or Firm* — Grant Johnson

(57) ABSTRACT

A method, system and computer program product for user interface action recommendations. According to the method, a target segment in a target document is determined. Correlation degree between the target segment and at least one source segment in at least one source document is determined. At least one recommended source segment is provided from the at least one source segment based on the correlation degree for a user interface action, such as copying for pasting the target segment.

16 Claims, 9 Drawing Sheets

(56) References Cited

U.S. PATENT DOCUMENTS

2021/0232542 A1* 7/2021 Dhanabalan ...... G06F 16/24578

OTHER PUBLICATIONS

"A method of improving copy-paste functionality by introducing context-awareness," IP.Com, An IP.com Prior Art Database Technical Disclosure, IP.com No. IPCOM000216905D, IP.com Electronic Publication Date: Apr. 23, 2012, 4 pages, https://priorart.ip.com/IPCOM/000216905.

"Intelligent Documentation Assistant System," IP.Com, An IP.com Prior Art Database Technical Disclosure, IP.com No. IPCOM000236575D, IP.com Electronic Publication Date: May 5, 2014, 13 pages, https://priorart.ip.com/IPCOM/000236575.

* cited by examiner

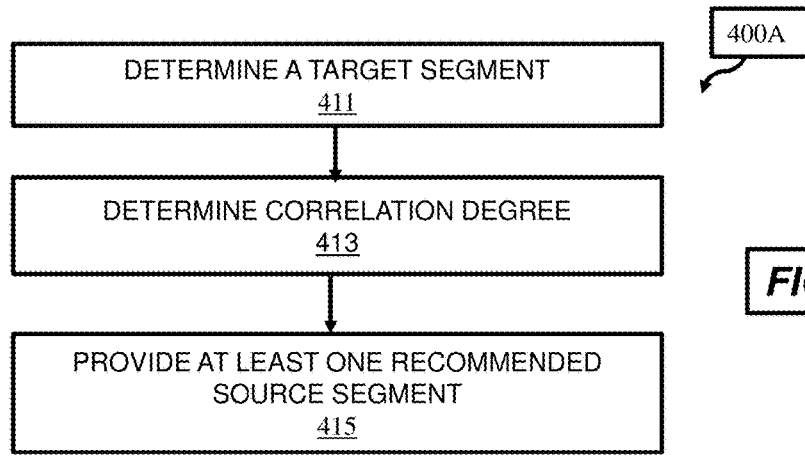
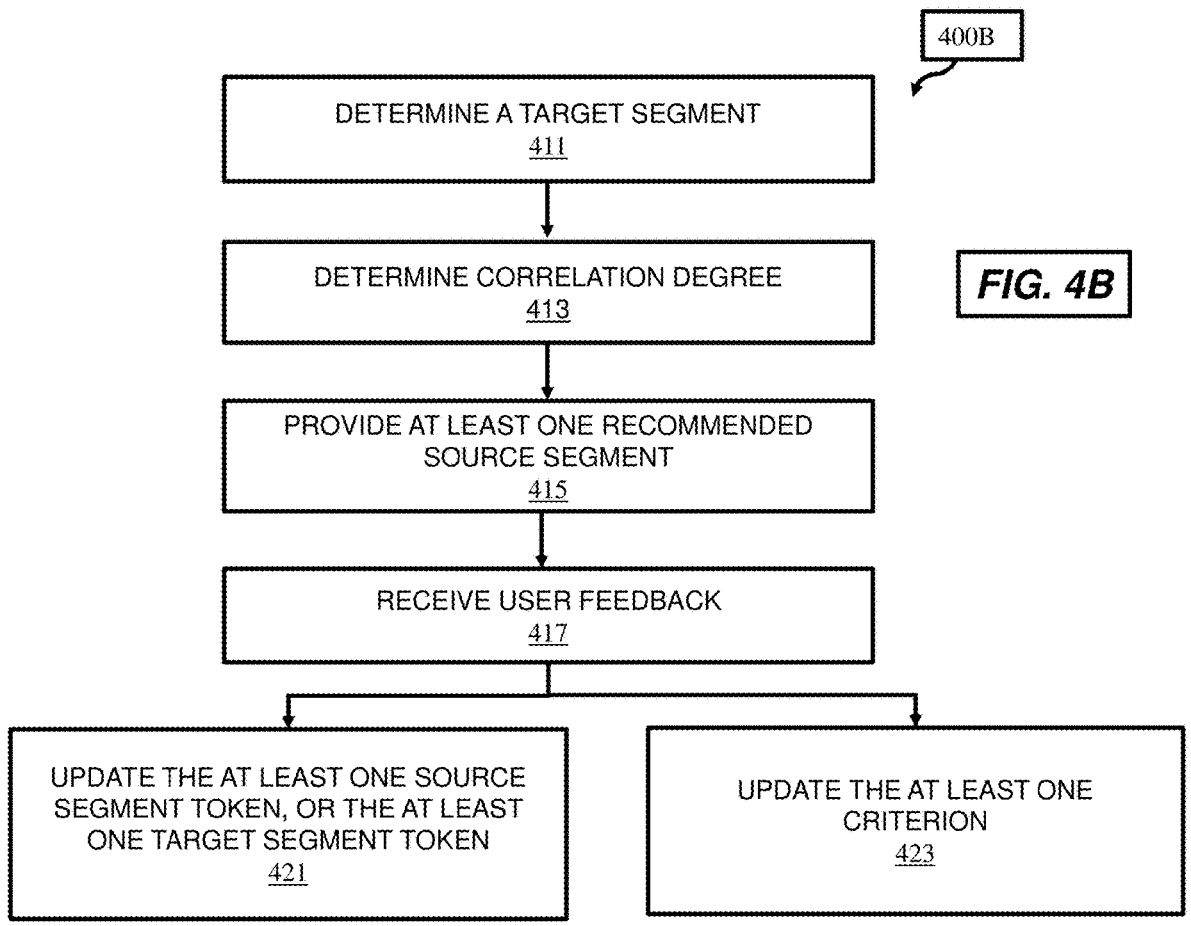

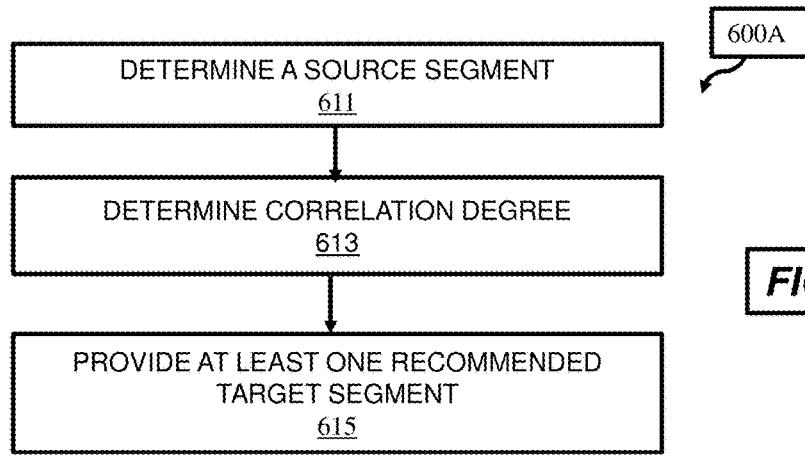
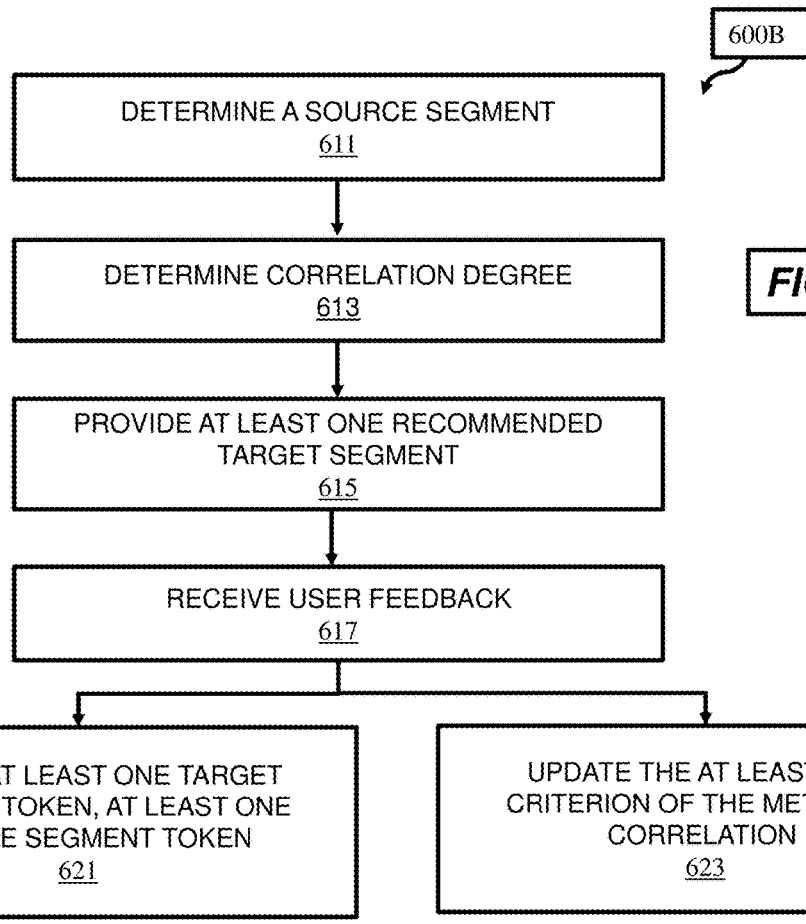

RECOMMENDATIONS FOR USER INTERFACE ACTIONS

BACKGROUND

The present disclosure generally relates to document processing, and more specifically, to methods, systems, and computer program products for providing recommendations for user interface actions.

Copy and paste are widely used actions that offer an inter-process communication technique for transferring data through a computer's user interface. The copy command creates a duplicate in which selected data is kept in temporary storage (e.g., the clipboard). The data from the clipboard is later inserted wherever a paste command is issued. This allows easy data transfer between applications.

SUMMARY

According to an aspect of the disclosure, there is a method, computer program product and/or system that performs the following operations (not necessarily in the following order) to recommend a source segment for pasting to a given target segment. According to the method, a target segment in a target document is determined. Correlation degree between the target segment and at least one source segment in at least one source document is determined. At least one recommended source segment is provided from the at least one source segment based on the correlation degree for a user interface action, such as copying for pasting the target segment.

According to another aspect of the disclosure, there is a method, computer program product and/or system that performs the following operations (not necessarily in the following order) to recommend a target segment for copying from a given source segment. According to the method, a source segment in a source document is determined. Correlation degree between the source segment and at least one target segment in at least one target document is determined. At least one recommended target segment is provided based on the correlation degree for a user interface action, such as pasting the source segment to be copied.

It is to be understood that this Summary is not intended to identify the key or essential features of embodiments of the disclosure, nor is it intended to be used to limit the scope of the disclosure. Other features of the disclosure will become easily comprehensible through the description below.

BRIEF DESCRIPTION OF THE DRAWINGS

Through the more detailed description of embodiments of the disclosure and the accompanying drawings, the above and other objects, features, and advantages of the present disclosure will become more apparent, wherein the same reference generally refers to the same or similar components in the embodiments.

FIG. 4A depicts a flowchart for providing at least one recommended source segment for pasting to a target segment in accordance with some embodiments of the disclosure.

FIG. 4B depicts another flowchart for providing at least one recommended source segment for pasting to a target segment in accordance with some embodiments of the disclosure.

FIG. 6A depicts a flowchart for providing at least one recommended target segment for copying from a source segment in accordance with some embodiments of the disclosure.

FIG. 6B depicts another flowchart for providing at least one recommended target segment for copying from a source segment in accordance with some embodiments of the disclosure.

DETAILED DESCRIPTION

Figure 1:
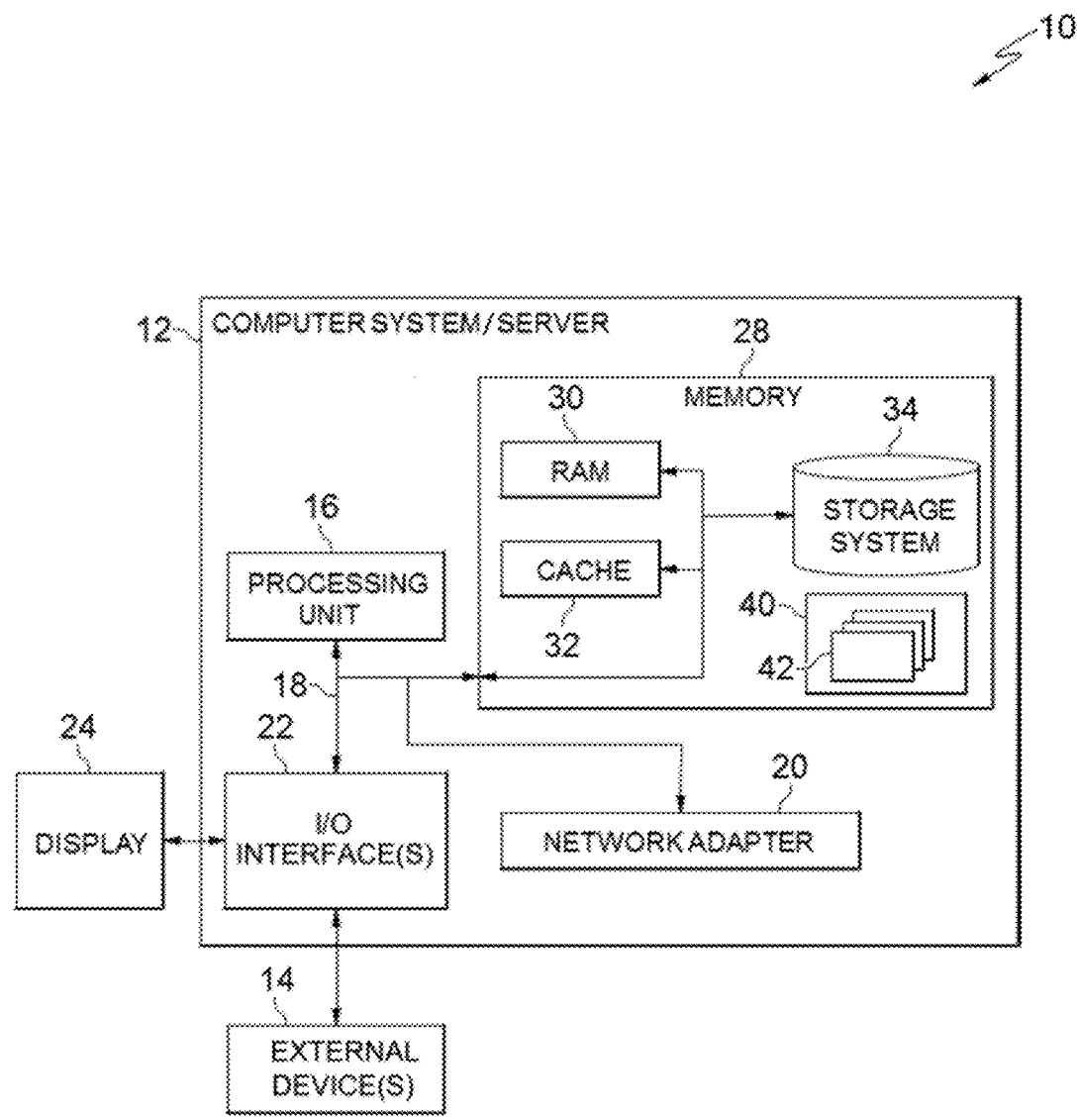
FIG. 1 depicts a cloud computing node according to an embodiment of the disclosure.

Some embodiments of the disclosure will be described in more detail with reference to the accompanying drawings, in which some embodiments of the disclosure have been illustrated. However, some embodiments of the disclosure may be implemented in various manners, and thus should not be construed to be limited to the embodiments disclosed herein. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the disclosure.

It is to be understood that although this disclosure includes a detailed description on cloud computing, implementations of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth herein.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that may couple various system components, including system memory 28, to a processor 16.

Bus 18 may represent one or more of any of several types of bus structures, including a memory bus or memory controller, a peripheral bus, an accelerated graphics port, and a processor or local bus using any of a variety of bus architectures. By way of example, and not limitation, such architectures include: Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include one or more computer system readable media. Such media may be any available media that is accessible by computer system/server 12, and may include both volatile and non-volatile media, and may include both removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided in some embodiments. In such instances, some or all may be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Some or all of the operating system, one or more application programs, other program modules, and program data or some combination thereof, may include an implementation of a networking environment. Program modules 42 may carry out the functions and/or methodologies of embodiments of the disclosure as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
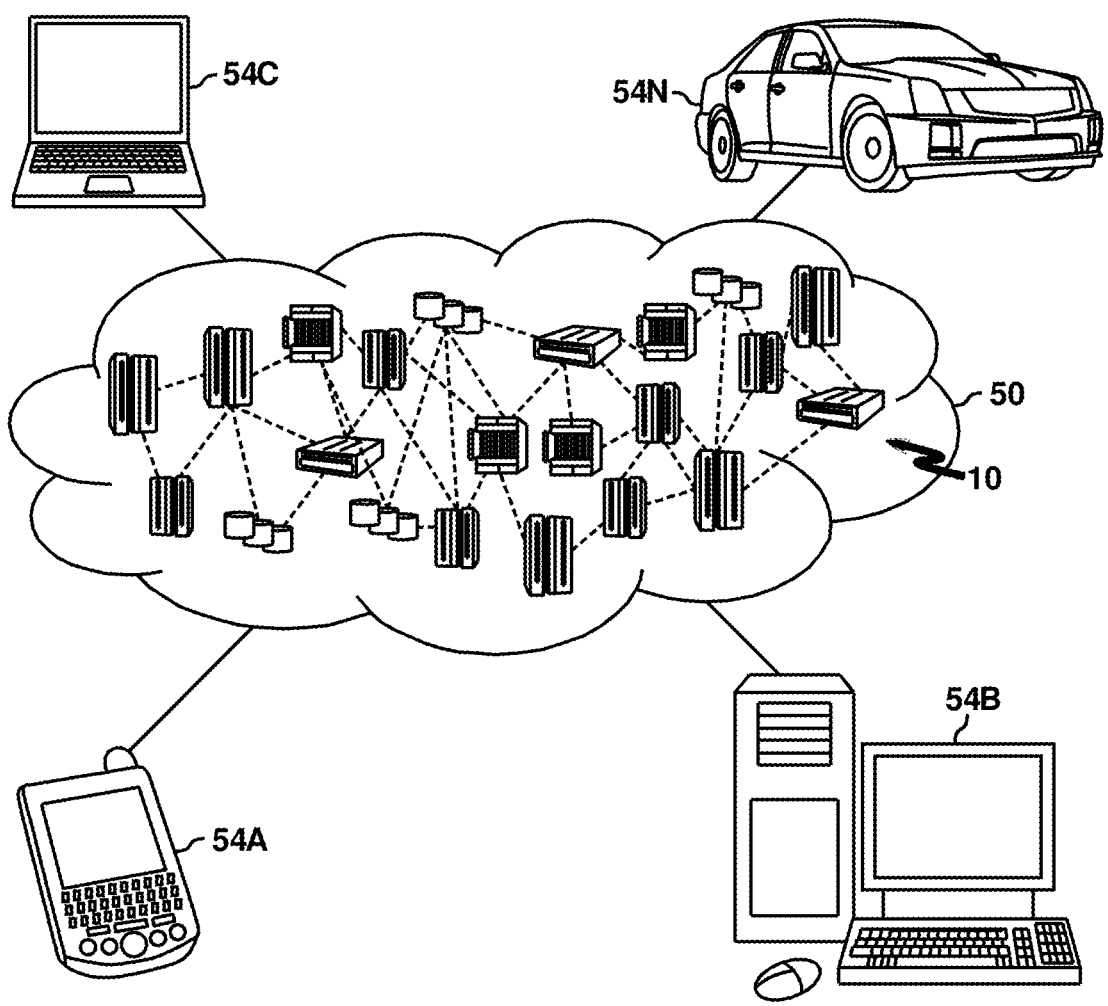
FIG. 2 depicts a cloud computing environment according to an embodiment of the disclosure.

Referring now to FIG. 2, an illustrative cloud computing environment 50 is depicted. As shown, cloud computing environment 50 may include one or more cloud computing nodes 10 with which local computing devices used by cloud consumers, such as, for example: personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein, or a combination thereof. This may allow cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 may communicate with any type of computerized device over any type of network and/or network addressable connection (e.g., using a web browser).

Figure 3:
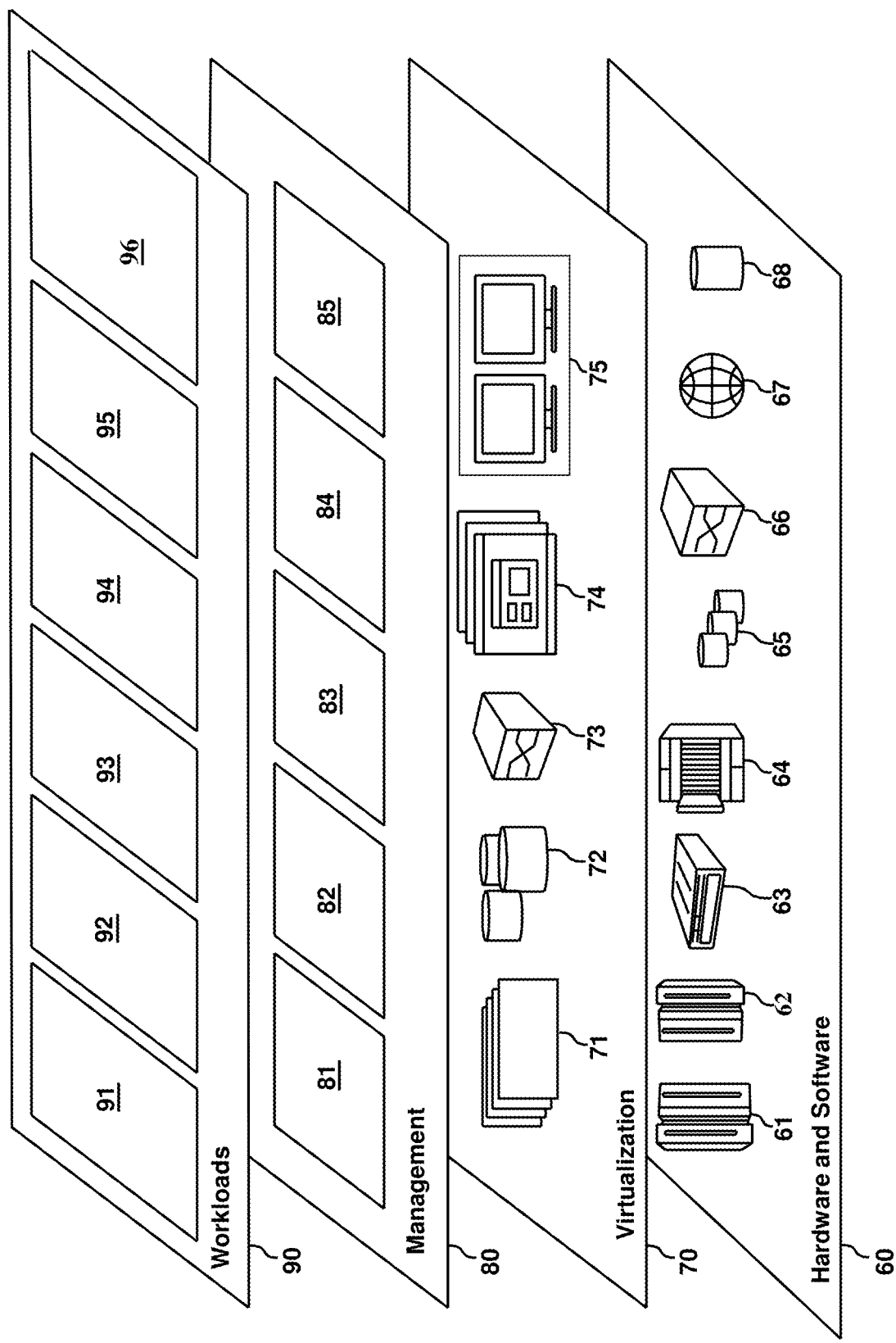
FIG. 3 depicts abstraction model layers according to an embodiment of the disclosure.

Referring now to FIG. 3, a set of functional abstraction layers provided by cloud computing environment 50 (FIG. 2) is shown, consistent with some embodiments. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 may include hardware and software components. Examples of hardware components may include: mainframes 61; RISC (Reduced Instruction Set Computer) architecture based servers 62; servers 63; blade servers 64; storage devices 65; and networks and networking components 66. In some embodiments, software components may include network application server software 67 and database software 68.

Virtualization layer 70 may provide an abstraction layer from which the following examples of virtual entities may be provided: virtual servers 71; virtual storage 72; virtual networks 73, including virtual private networks; virtual applications and operating systems 74; and virtual clients 75.

Management layer 80 may provide the functions described below in one example. Resource provisioning 81 may provide dynamic procurement of computing resources and other resources that are utilized to perform tasks within the cloud computing environment. Metering and Pricing 82 may provide cost tracking as resources are utilized within the cloud computing environment, and billing or invoicing for consumption of these resources. In one example, these resources may include application software licenses. Security may provide provides identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with an SLA.

Workloads layer 90 may provide examples of functionality for which the cloud computing environment may be utilized. Examples of workloads and functions that may be provided from this layer include, without limitation: mapping and navigation 91; software development and lifecycle management 92; virtual classroom education delivery 93; data analytics processing 94; transaction processing 95; and copy/paste recommendation 96.

When a target document is being edited by a user who intends to find a paragraph in a source document for pasting to the target document, the user needs to manually find the source document and select a source segment from it. A similar case arises when a source document is edited by a user who intends to copy a paragraph in the source document to a target document. One drawback of these systems is that it is time consuming and not intelligent to manually select a piece of content in a source document for copying, or to manually select a place in a target document at which the piece of content is to be pasted. As an example, a document (either source document or target document) can be a file stored in a computer system, a file stored in an online editing server, a or a piece of message loaded in a memory accessible by an applications (such as a social media application, and so on).

Accordingly, one feature and advantage of some embodiments is to automatically recommend a source segment to be copied/pasted into a target document, or to automatically recommend a target segment to which the current source segment can be sent. Accordingly, with embodiments of this disclosure, it may be more convenient, time efficient and intelligent to select a piece of content to be copied, or select a target place where a piece of content is to be pasted to.

Automatically Selecting a Source Segment

FIG. 4A depicts a flowchart 400A of a process for providing at least one source segment recommended for pasting to a target segment in accordance with some embodiments of the disclosure. The process may proceed while a user is editing a document. During editing the document, the user may desire to copy a piece of content from another document and paste it into a position in the document under editing. For ease of description, hereinafter, the document under editing and the position will also be referred to as "target document" and "target segment" respectively. Correspondingly, the other documents and the piece of content will also be referred to as "source document" and "source segment" respectively.

At operation 411, a target segment in a target document can be determined by, for example, computer system/server 12 in FIG. 1. The target segment may be, for example, a place where a cursor stays, a paragraph in which the cursor stays, or any other position or part that is appointed/selected by the user as a place to accept the content to be pasted. The determination of the target segment may be triggered by an action by the user, such as a button click, hot key, voice command and so on, that may demonstrate an intention to copy some content from some other place (or places) and paste it to the target segment.

At operation 413, a correlation degree between the target segment and at least one source segment in at least one source document may be determined by, for example, computer system/server 12 in FIG. 1. The correlation degree may be a measurement of how close the target segment and the source segment are correlated with each other in some embodiments. The higher the correlation degree, the more likely it is that the user will copy the source segment and paste it into the target segment. The source documents may be determined based on various rules. For example, all local documents stored in the same computer of the target document may be determined as the source documents in some embodiments. For another example, documents stored in the same folder (or a same level of directory) of the target document may be determined as the source documents in some embodiments. For yet another example, documents currently opened (such as, loaded into the memory) by the same or different applications may be determined as the source documents in some embodiments. It is also understood that those examples are provided for illustration only, without suggesting any limitation regarding how to determine the source documents.

According to embodiments of this disclosure, the correlation degree may be determined using context correlation between the target segment and each of the at least one source segment and/or metadata correlation between the target segment and each of the at least one source segment.

Figure 5A:
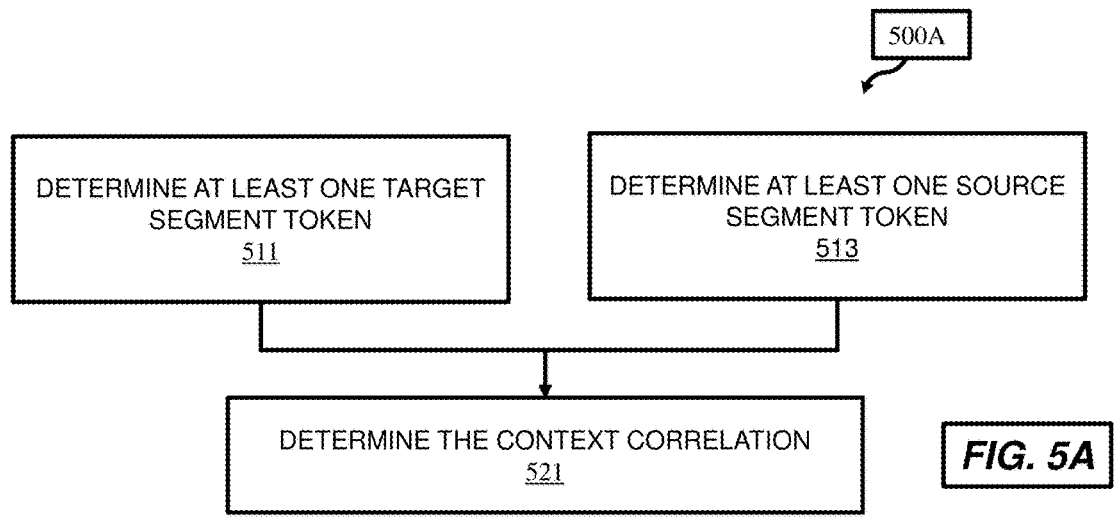
FIG. 5A depicts a flowchart for determining correlation degree based on context correlation for providing at least one recommended source segment in accordance with some embodiments of the disclosure.

Now, with reference to FIG. 5A, the operation 413 of determining the correlation degree based on the context correlation will be further illustrated as below. FIG. 5A depicts a flowchart 500A for determining a correlation degree based on context correlation for providing at least one recommended source segment in accordance with some embodiments of the disclosure. In the context of some embodiments, the term "context correlation" may refers to the correlation of a source segment and a target segment from a context perspective and, may particularly refer to, the correlation between context of a target segment and a context of a source segment.

At operation 511, at least one target segment token of the target segment can be determined. The target segment token may be key words/entity words extracted from the target segment or context associated with the target segment (e.g., adjacent paragraphs of the target segment) by using natural language processing (NLP) tools. For example, if the target segment represents a place where a cursor stays, the target segment token may be extracted from the context associated with the place, such as one or more paragraphs above the cursor position or below the cursor position. If the target segment represents a paragraph where the cursor stays, the target segment token may be extracted from the paragraph itself and/or other paragraphs around it. Table 1 below shows example target segment tokens extracted, wherein the terms "blockchain" and "cloud" under the table header "Target Segment Token" are key words identified for the target segment.

TABLE 1

| Target Segment Tokens |
| --- |
| blockchain, cloud |

The source segments that are most likely to be pasted into the target segment may contain a token, such as keywords, that is same as or similar to that of the target segment. Furthermore, in order to enhance accuracy in recommending source segment, the source segment token may include tokens present in the source segment per se (e.g., inside source segment token). Additionally, it may also include a token appearing elsewhere within the whole source document (e.g., affiliated source segment token).

At operation 513 at least one source segment token for each of the at least one source segment may be determined. It is also to be noted that operation 511 and operation 513 may be executed in serial or in parallel, and the order shown in FIG. 5A does not suggest any limitation to this disclosure. At operation 521, the context correlation between the target segment and the at least one source segment may be determined based on the at least one target segment token, determined at operation 511, and the at least one source segment token, determined at operation 513.

Table 2 below shows example source segment tokens, consistent with some embodiments. In this example, it can be noted that for segment <1000001, Par1>(row 2 of Table 2), inside source segment tokens include "blockchain" and "cloud", while affiliated source segment tokens include "cloud", "Kubenetes", "x86" and "SaaS". For segment <1001002, Par1>(row 4 of Table 2), inside source segment tokens include "blockchain" and "cloud", while affiliated source segment tokens include "blockchain", "cloud", "container". At the level of inside source segment token, segment <1000001, Par 1> is similar to segment <1001002, Par1>. However, at the level of affiliate source segment token, document "1001002" is more correlated to the target segment than document "1000001". The context correlation degree of segment <001002, Par 1>(row 4 of Table 2) with the target segment is, therefore, higher than that of the segment<1001001, Par1>(row 2 of Table 2) with the target segment.

TABLE 2

| Source Document ID | Source Segment ID | Inside source segment token | Affiliated source segment token | Context correlation degree 1-5 ("1" is highest degree) |
|---|---|---|---|---|
| 1000001 | Par1 | Blockchain, Cloud | Cloud, Kubernetes, x86, SaaS | 2 |
| 1000001 | Par2 | Cloud, SaaS | Cloud, Kubernetes, x86, SaaS | 3 |
| 1001002 | Par1 | Blockchain, Cloud | Blockchain, Cloud, Container | 1 |
| 1001002 | Table2 | Container, Blockchain | Blockchain, HSM, Cloud, Container | 2 |
| 1100003 | Par5 | Blockchain, Cloud | Blockchain, HSM, Cloud | 1 |
| 1100003 | Par10 | Blockchain, Linux | HSM, server | 4 |
| 1100004 | Page 4 | Blockchain, support | SaaS, Cloud, DBaaS, Blockchain | 2 |
| . . . | | | | |

Table 3 below shows rules to determine the correlation degree based on context correlation shown in Table 2, consistent with some embodiments. Table 3 is provided for illustrative purposes only; the rules, as well as the values of correlation degree, are provided without suggesting any limitation to the disclosure. Different rules may be designed and adopted to fit for practical business needs. Additionally, in the second column of Table 3, scores 1-5 may measure the correlation between the target segment and at least one source segment. In this example, a score of 1 may mean the highest correlation degree and a score of 5 may mean the lowest correlation degree. Note that other score measurements, like percentile, centile, etc. may be used, additionally or alternatively.

TABLE 3

| Rules to determine correlation degree | correlation degree (1-5) |
|---|---|
| The inside source segment tokens contain all target segment tokens, and The affiliated source segment tokens contain all target segment tokens | 1 |
| The inside source segment tokens contain all target segment tokens and the affiliated source segment tokens contain part of the target segment tokens, or The affiliated source segment tokens contain all target segment tokens and the inside source segment tokens contain part of the target segment tokens | 2 |
| Both the inside source segment tokens and the affiliated source segment tokens contain part of the target segment tokens | 3 |
| Only one of the inside source segment tokens or the affiliated source segment tokens contain part of the target segment tokens | 4 |
| Neither the inside source segment tokens nor the affiliated source segment tokens contain any of the target segment token | 5 |

Figure 5B:
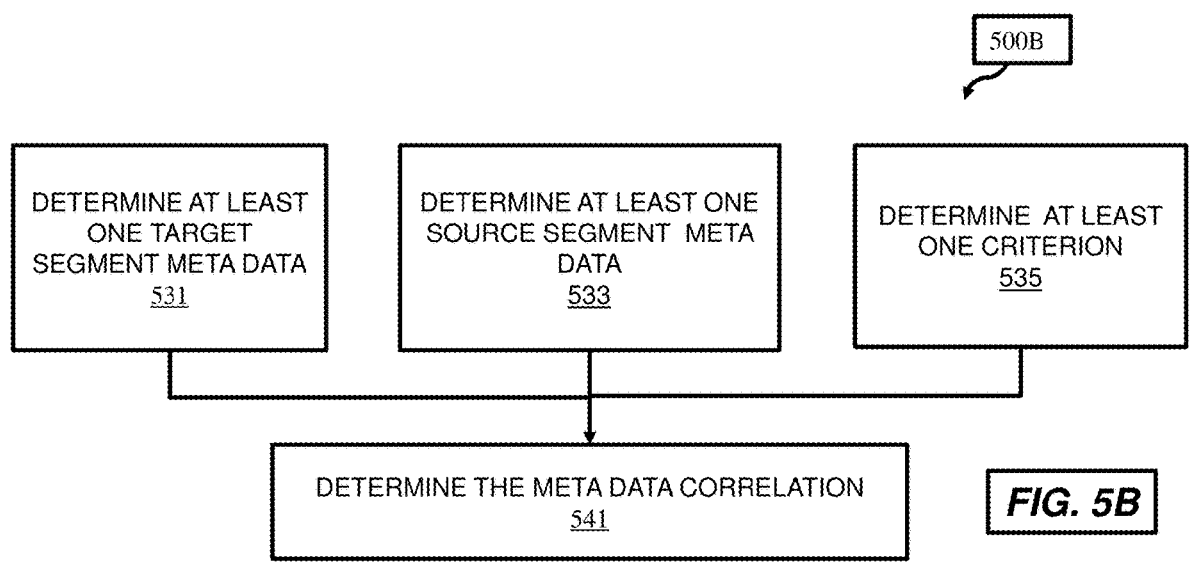
FIG. 5B depicts a flowchart for determining correlation degree based on metadata correlation for providing at least one recommended source segment in accordance with some embodiments of the disclosure.

In the above description of operation 413 in FIG. 4A, the correlation degree may be determined based on context correlation. Additionally or alternatively, the correlation degree may be determined based on metadata correlation. This will be illustrated now with reference to FIG. 5B. More specifically, FIG. 5B depicts a flowchart 500B for determining correlation degree based on metadata correlation for providing at least one recommended source segment in accordance with some embodiments of the disclosure. The term metadata correlation may represent a correlation from metadata perspective, which may be measured by metadata of a target segment and corresponding metadata of a source segment.

At operation 531, at least one target segment metadata for the target segment may be determined. The metadata may be selected from at least one of the following of the target segments: associated role of the target segment, associated timing of the target segment, and associated document type of the target segment. As illustrated in Table 4 below, the associated role may be, for example, an owner of the segment or the team that the owner belongs. The associated timing may be, for example, a create time of the target segment, a last visit time of the target segment, etc. In the context of the description, the term "owner" of a segment may refer to one has created the segment and thus owns the segment, and the owner may be a member of a group or collaborative team. The term "create time" of a segment may refer to the time when the segment was created. And the term "last visit time" may refer to the time when the segment was last written or read. The metadata may also include a document type. For example, "WORD" in the fifth column of Table 4 may denote that the corresponding segment is created with a MS Word® application (MS Word is available from Microsoft Corp.) Note that metadata in Table 4 below are provided for illustration purpose only, and without suggesting any limitation to this disclosure.

As mentioned above, an owner may be a member of a collaborative team. For example, collaborative writing or online editing may be writing done by more than one person and/or entity (e.g., a trained artificial intelligence system). Because collaborative writing or online editing may include more metadata to be used (e.g., who has ever edited which paragraph, who is owner of the paragraph, etc.) compared with that of the conventional, non-collaborative editing, examples below will be described around the collaborative writing for illustrative purposes. However, it is to be understood that embodiments of this disclosure can also be used in traditional editing software (non-collaborative) installed in personal computer.

TABLE 4

| Target segment owner | Target segment owner's team ID | Target segment create time | Target segment last visit time | Target document type |
|---|---|---|---|---|
| Peter | 123 | 20191011 | 20191120 | WORD |

At operation 533, at least one source segment metadata for each of the at least one source segment may be determined. The types of source segment metadata collected can be matched with that of the target segment metadata. Table 5 below shows the source segment metadata collected in one illustrative example, including: source segment owner, source segment owner's team ID, source segment create time, source segment last visit time, and source document type.

TABLE 5

| Source document ID | Source segment ID | Source segment owner | Source segment owner's team ID | Source segment create time | Source segment last visit time | Source document type |
|---|---|---|---|---|---|---|
| 1000001 | Par1 | Lisa | 456 | 20190210 | 20190511 | WORD |
| 1000001 | Par2 | Peter | 123 | 20190210 | 20191125 | WORD |
| 1001002 | Par1 | Peter | 123 | 20191030 | 20191122 | WORD |
| 1001002 | Table2 | Robin | 123 | 20191020 | 20191031 | WORD |
| 1100003 | Par5 | Robin | 123 | 20191020 | 20191031 | WORD |
| 1100003 | Par10 | Peter | 123 | 20191103 | 20191119 | WORD |
| 1100004 | Page 4 | Tom | 789 | 20200101 | 20200215 | PPT |
| ... | | | | | | |

At operation 535, at least one criterion for the metadata correlation may be determined. Table 6 below shows an example of a set of the scoring criteria, consistent with some embodiments. In this example, in the case that the target segment and the source segment share a common owner, then the score may be 4. In the case that the owners of the target segment and the source segment are different but belong to the same team, then the score may be 3. In the case that the create time gap between the source segment and target segment is less than one month, the score may be 3; otherwise, if it is less than month but longer than one week, the score may be 1. In the case that the last visit time gap between the source segment and the target segment may be less than one week, the score may be 4; otherwise, if it is less than one month but longer than one week, the score may be 3. In the case that the source document and the target document are of the same document type, the score may be 5. These scoring criteria are provided for illustration purpose without suggesting any limitation; other scoring criteria may exist that are consistent this disclosure. Additionally, operation 531, operation 533, and operation 535 may be executed in serial or in parallel and the order illustrated in FIG. 5B does not suggest and limitation to this disclosure.

TABLE 6

| Scoring criteria | |
|---|---|
| Condition | Scores |
| Same segment owner | 4 |
| Segment owners belonging to same team | 3 |
| Create time gap < one month | 3 |
| One month < Create time gap < one year | 1 |
| Last visit time gap < one week | 4 |
| One week < Last visit time gap < one month | 3 |
| Same document type | 5 |

At operation 541, the metadata correlation between the target segment and each of the at least one source segment may be determined based on the at least one criterion, and comparison between the at least one target segment metadata and the at least one source segment metadata. According to the example criteria illustrated in the Table 6 above, Table 7 is provided below to further illustrate the scores of the source segments determined, consistent with some embodiments. In Table 7, the scores are included in brackets. For example, "0" in row 2 column 3 of Table 7 means the corresponding score is 0 because, for example, Lisa is not Peter and they do not belong to a same time. For another example, "1" in row 2 column 5 of Table 7 means corresponding score is 1 because, for example, a create time of source segment <1000001, Par 1> and that of the target segment is longer than 1 month but less than 1 year.

TABLE 7

| Source document ID | Source segment ID | Source segment owner (score) | Source segment owner's team ID (score) | Source segment create time (score) | Source segment last visit time (score) | Source document type (score) |
|---|---|---|---|---|---|---|
| 1000001 | Par1 | Lisa(0) | 456(0) | 20190210(1) | 20190511(0) | WORD (5) |
| 1000001 | Par2 | Peter(4) | 123(0) | 20190210(1) | 20191125(4) | WORD (5) |
| 1001002 | Par1 | Peter(4) | 123(0) | 20191030(3) | 20191122(4) | WORD (5) |
| 1001002 | Table2 | Robin(0) | 123(3) | 20191020(3) | 20191031(3) | WORD (5) |
| 1100003 | Par5 | Robin(0) | 123(3) | 20191020(3) | 20191031(3) | WORD (5) |
| 1100003 | Par10 | Peter(4) | 123(0) | 20191103(3) | 20191119(4) | WORD (5) |
| 1100004 | Page 4 | Tom (0) | 789(0) | 20200101(1) | 20200215(0) | PPT (0) |
| ... | | | | | | |

Furthermore, Table 8 below shows the total score calculated based on scores of each metadata shown in Table 7 above and the correlation degree between the source segment and target segment, consistent with some embodiments. For example, total scores of source segment <1000001,Par1>(i.e. "6") may be a sum of score of "source segment owner"(i.e."0"), score of "source segment owner's team ID"(i.e. "0"), score of "source segment create time" (i.e. "1"), score of "source segment last visit time" (i.e. "0") and score of "source document type" (i.e. "5"). As previously assumed, here a correlation degree of "1" may represent the closest correlation between the source segment and the target segment, a correlation degree of "5" represents the least close correlation between the source segment and the target segment. It can be understood from the example in Table 8 that source segment <1000001, Par2>, source segment <"1001002, Table 2>, and source segment <1100003, Par5> may be three source segments that are most closely related to the target segment from metadata perspective, because their corresponding metadata correlation degrees are all "1".

TABLE 8

| Source document ID | Source segment ID | Total score | metadata correlation degree |
|---|---|---|---|
| 1000001 | Par1 | 6 | 4 |
| 1000001 | Par2 | 14 | 1 |
| 1001002 | Par1 | 12 | 2 |
| 1001002 | Table2 | 14 | 1 |
| 1100003 | Par5 | 14 | 1 |
| 1100003 | Par10 | 12 | 2 |
| 1100004 | Page 4 | 1 | 5 |
| ... | | | |

According to some embodiments of the disclosure, the context correlation and metadata correlation may be used separately or combined together for determining the final correlation degree between the target segment and each of the source segments. If combined, the final correlation degree may be a weighted average of the context correlation degree and metadata correlation degree. For simplicity, Table 9 below provides an example of final correlation degree that is calculated based on evenly weighted average of context correlation degree and metadata correlation degree, wherein both the context correlation degree and the metadata correlation degree may be assigned a same weight of 50%. As shown in Table 9, source segment <1100003, Par5> is most correlated with the target segment. Note that the weight of context correlation degree and metadata correlation degree are only provided for illustration purposes without suggesting any limitation, and the context correlation degree and the metadata correlation degree may be differently weighted.

TABLE 9

| Source document ID | Source segment ID | Context correlation degree | metadata correlation degree | Final correlation degree |
|---|---|---|---|---|
| 1000001 | Par1 | 2 | 4 | 3 |
| 1000001 | Par2 | 3 | 1 | 2 |
| 1001002 | Par1 | 1 | 2 | 1.5 |
| 1001002 | Table2 | 2 | 1 | 1.5 |
| 1100003 | Par5 | 1 | 1 | 1 |
| 1100003 | Par10 | 4 | 2 | 3 |
| 1100004 | Page 4 | 2 | 5 | 3.5 |
| ... | | | | |

Referring again to FIG. 4A, at operation 415, at least one recommended source segment may be provided from the at least one source segment based on the correlation degree to be copied for pasting to the target segment. The operation 415 may be performed by, for example, computer system/server 12 in FIG. 1. For example, source segment <1100003, Par5>, for which the correlation degree "1" is the highest, may be presented to the user to decide whether to paste it.

Figure 8A:
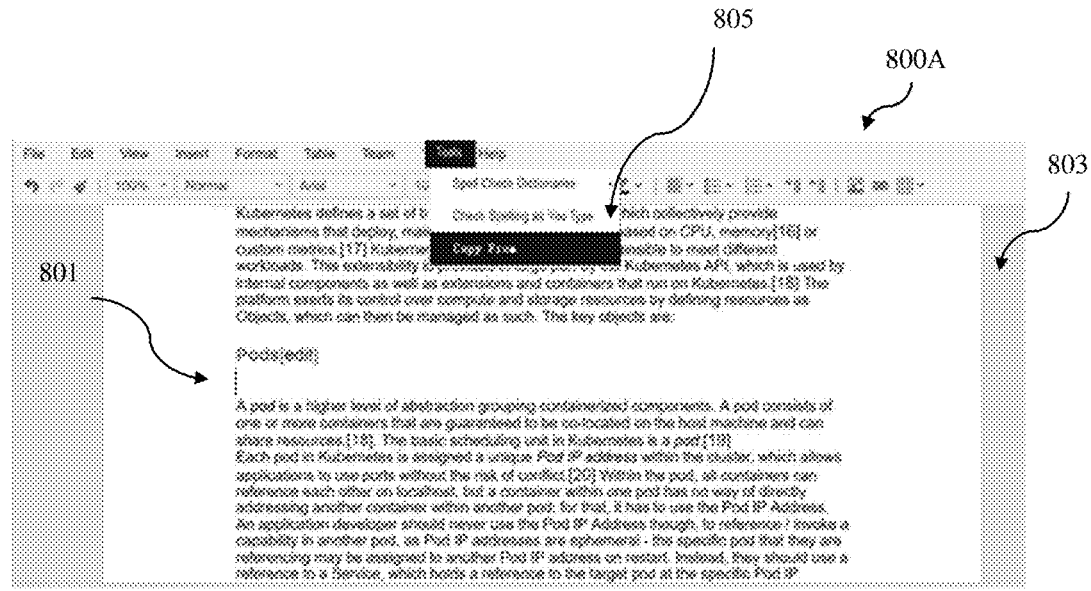
FIG. 8A depicts an example user interface of "copy from" function in accordance with some embodiments of the disclosure.

FIG. 8A depicts an example user interface providing a "copy from" function in accordance with some embodiments of the disclosure. The user interface 800A may show a target document 803 that is being edited by a user. At some point of time, the cursor may stop at a position 801. The cursor position 801 may represent a target segment to which something is desired to be pasted by using the function "copy from". The user may trigger the function "copy from" 805 by clicking an associated button, for example.

Figure 8B:
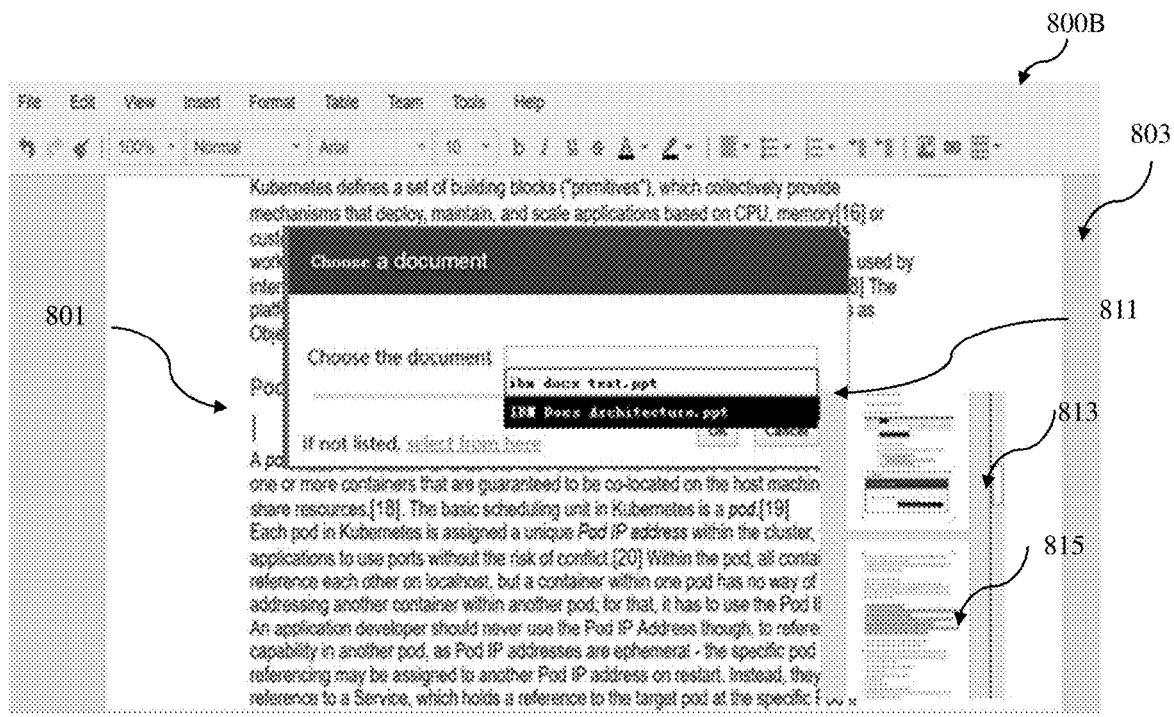
FIG. 8B depicts a follow up example user interface of "copy from" function in accordance with some embodiments of the disclosure.

FIG. 8B depicts a follow up example user interface 800B providing the "copy from" function in accordance with some embodiments of the disclosure. Same numbers in FIGS. 8A and 8B represent the same items, which will not be further repeated here. Once "copy from" function is triggered by the user, a follow up window (i.e. "choose a document") 811 may pop up, which may show a list of documents for the user to select. Once the user selects a document, another window 813 may pop up with a highlighted segment in it. The highlighted segment may represent a source segment 815 recommended to the user according to embodiments of the disclosure. Then the user may take some actions to provide a feedback to confirm whether source segment 815 is the object of the "copied from" function.

Turn to FIG. 4B, which depicts another flowchart 400B for providing at least one recommended source segment for pasting to a target segment in accordance with some embodiments of the disclosure. The same number in FIGS. 4A and 4B may represent the same or equivalent operations, which will not be repeated here. At operation 417, user feedback responsive to the at least one recommended source segment, e.g., source segment 815 of FIG. 8B, may be received by, for example, computer system/server 12 in FIG. 1. At operation 421, at least one of the following may be updated based on user feedback: the at least one source segment token and the at least one target segment token. The operation 421 may be performed by, for example, computer system/server 12 in FIG. 1

For example, according to Table 1 above, terms "blockchain" and "cloud" may be initially deemed as target segment tokens. The source segment finally confirmed by the user may include an additional key word "support" because the keyword "support" is also present in the context of the target segment. It is updated into Table 1 as an additional target segment token, resulting in Table 10 as shown below.

TABLE 10

| Updated target segment tokens |
|---|
| Blockchain, Cloud, Support |

Similarly, the set of source segment tokens may also be updated accordingly. Referring to following Table 11, source segment tokens of <1000001, Par2> may additionally include the term "support". With the updating of the source segment token(s), as well as the target segment token(s), context correlation degree may also be adjusted correspondingly. For example, context correlation degree of the source segment <1000001,Par1>, may be downgraded from 2 to 3 because both the inside source segment tokens and the affiliated source segment tokens of the source segment in this example now contain part of the target segment tokens after the update.

TABLE 11

| Source Document ID | Source Segment ID | Inside token of source segment | Affiliated source segment token | Context correlation degree 1-5 ("1" is highest degree) |
|---|---|---|---|---|
| 1000001 | Par1 | Blockchain, Cloud | Cloud Kubernetes, x86, SaaS | 3 |
| 1000001 | Par2 | Cloud, SaaS, Support | Cloud, Kubernetes, x86, SaaS, Support | 3 |
| . . . | | | | |

Referring again to FIG. 4B, from a metadata correlation perspective, at operation 423, the at least one criterion for the metadata correlation may be updated based on the user feedback. Operation 423 may be performed by, for example, computer system/server 12 in FIG. 1. For example, based on an indication of importance of the metadata "segment owner" in the feedback from the user's action responsive to the recommended source segment, the score of the "segment owner" may be upgraded from 4 to 5 in this example. For another example, based on an indication of less importance of the metadata "document type" in the feedback from the user's action responsive to the recommended source segment, the score of the "document type" may be downgraded from 5 to 4. These and other example updates for are shown in Table 12:

TABLE 12

| Criteria | Prior-update Score | Post-update Score |
|---|---|---|
| Same segment owner | 4 | 5 |
| Same team | 3 | 3 |
| Create time gap < one month | 3 | 3 |
| One month < Create time gap < one year | 1 | 0 |
| Last visit time gap < one week | 4 | 5 |
| One week < Last visit time gap < one month | 3 | 3 |
| Same document type | 5 | 4 |

It is to be noted that operation 421 and operation 423 may be executed in serial or in parallel, or separately depending on business needs, and the order illustrated in FIG. 4B does not suggest and limitation to this disclosure.

Above illustrated includes a process for recommending a source segment for the user to copy from. Similarly, a corresponding process for recommending a target segment for the user to paste to is illustrated below. As various embodiments have been provided with multiple examples above to demonstrate the process for recommending a source segment, the process for recommending a target segment will be illustrated more briefly, without repeating the more detailed examples for the purpose of consistency.

Automatically Selecting A Target Segment

FIG. 6A depicts a flowchart 600A for providing at least one recommended target segment for copying from a source segment in accordance with some embodiments of the disclosure. At operation 611, a source segment in a source document may be determined by, for example, computer system/server 12 in FIG. 1. The determination of the source segment may be triggered by an action by the user, such as clicking a button, pressing a hot key, uttering a voice command, etc., that may demonstrate the user's intention to copy the source segment.

At operation 613, correlation degree between the source segment and at least one target segment in at least one target document may be determined by, for example, computer system/server 12 in FIG. 1. The target documents may be determined based on various rules. For example, all local documents stored in the same computer of the source document may be determined as the target documents. For another example, documents stored in the same folder (or a same level of directory) of the source document may be determined as the target documents. For yet another example, documents currently opened (such as, loaded into the memory) by the same or different applications may be determined as the target documents. It is also understood that these examples are provided for illustration only, without suggesting any limitation regarding how to determine the target documents.

The correlation degree may be used to measure the correlation between the source segment and the target segment. The more correlated between the two segments, the more likely the user will copy the source segment into the target segment. At operation 615, at least one recommended target segment from the at least one target segment may be provided, based on the correlation degree, for pasting the source segment to be copied. Operation 615 may be performed by, for example, computer system/server 12 in FIG. 1. Then, the user may select or confirm the recommended target segment for accepting the source segment to be copied. The source segment may be, for example, a paragraph selected by the user. The recommended target segment may be, for example, a position in a document for pasting the source segment or a portion of the document for being replaced by the source segment.

Figure 7A:
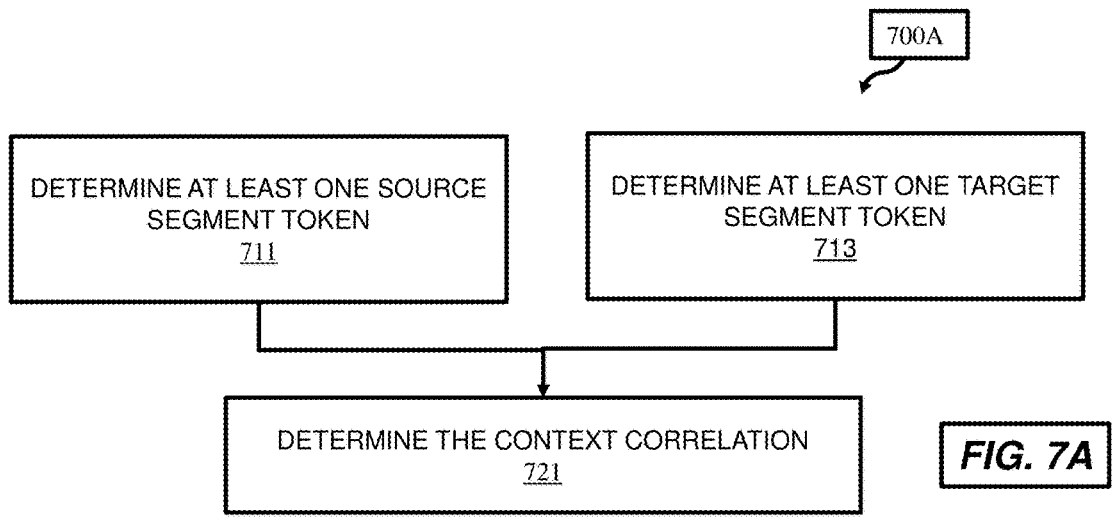
FIG. 7A depicts a flowchart for determining correlation degree based on context correlation for providing at least one recommended target segment in accordance with some embodiments of the disclosure.

In accordance with embodiments of this disclosure, the correlation degree may be determined based on context correlation between the source segment and each of the at least one target segment. FIG. 7A depicts a flowchart 700A for determining correlation degree based on context correlation for providing at least one recommended target segment in accordance with some embodiments of the disclosure. At operation 711, at least one source segment token for the source segment may be determined. The source segment token may be key words/entity words extracted from the source segment or context associated with the source segment (for example, adjacent paragraphs of the source segment) by using natural language processing (NLP) tools. At operation 713, at least one target segment token for each of the at least one target segment may be determined. The at least one target segment token may be key words/entity words extracted from the target segment or context associated with the target segment (e.g., adjacent paragraphs of the target segment) by using NLP tools. At operation 721, the context correlation between the source segment and the at least one target segment may be determined based on the at least one source segment token determined at operation 711 and the at least one target segment token determined at operation 713. In accordance with embodiments of this disclosure, the target segment token may include a token present in the target segment (e.g., inside target segment token), and additionally, may also include a token appearing within the whole target document (e.g., affiliated target segment token). It is also to be noted that operation 711 and operation 713 may be executed in serial or in parallel and the order illustrated in FIG. 7A does not suggest and limitation to this disclosure.

Figure 7B:
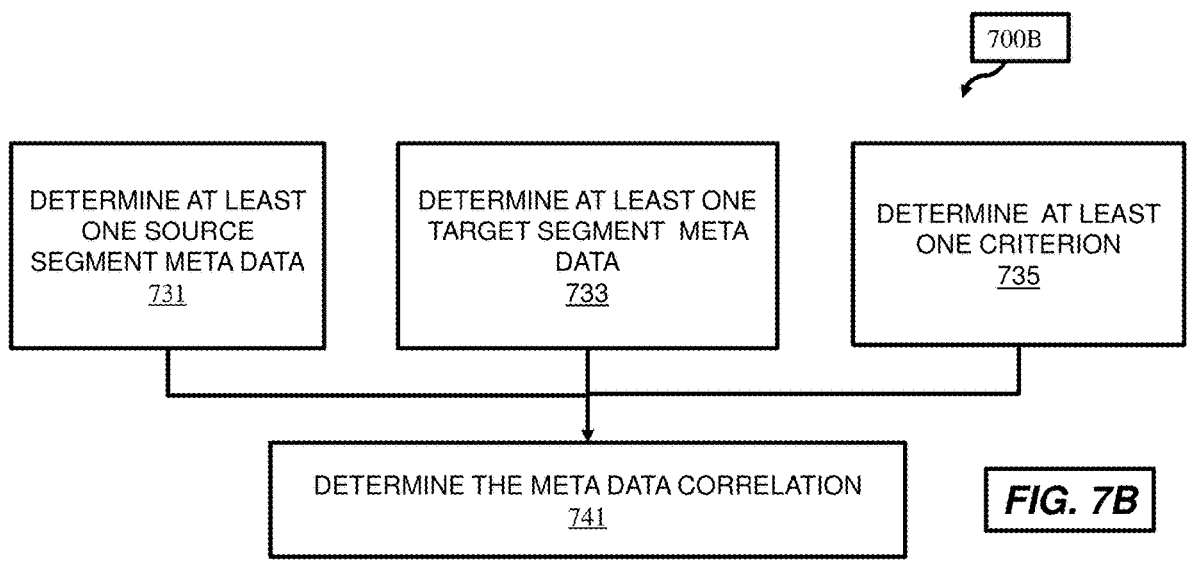
FIG. 7B depicts a flowchart for determining correlation degree based on metadata correlation for providing at least one recommended target segment in accordance with some embodiments of the disclosure.

In accordance with some embodiments of this disclosure, the correlation degree may be determined based on metadata correlation between the source segment and each of the at least one target segment. The metadata may be selected from at least one of the following: associated role, associated timing, and associated document type, etc. FIG. 7B depicts a flowchart 700B for determining correlation degree based on metadata correlation for providing at least one recommended target segment in accordance with some embodiments of the disclosure. At operation 731, at least one source segment metadata may be determined for the source segment. At operation 733, at least one target segment metadata may be determined for each of the at least one target segment. At operation 735, at least one criterion may be determined for the metadata correlation. At operation 741, the metadata correlation between the source segment and each of the at least one target segment may be determined based on the at least one criterion, and on comparison between the at least one source segment metadata and the at least one target segment metadata. It is also noted that operation 731, operation 733, and operation 735 may be executed in serial or in parallel, and that the order illustrated in FIG. 7B does not suggest and limitation to this disclosure.

Figure 9A:
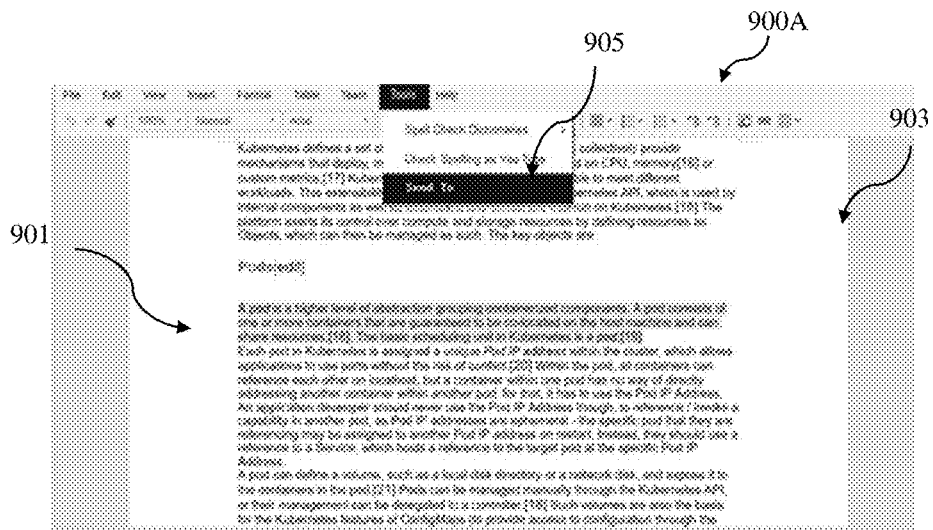
FIG. 9A depicts an example user interface of "send to" function in accordance with some embodiments of the disclosure.

FIG. 9A depicts an example user interface 900A which provides a "send to" function in accordance with some embodiments of the disclosure. The user interface 900A shows a source document 903 that is being edited by a user. At some point of time, the user may have selected a part of paragraph 901 as the source segment. Function "send to" 905 may be triggered if the user clicks an associated button, for example.

Figure 9B:
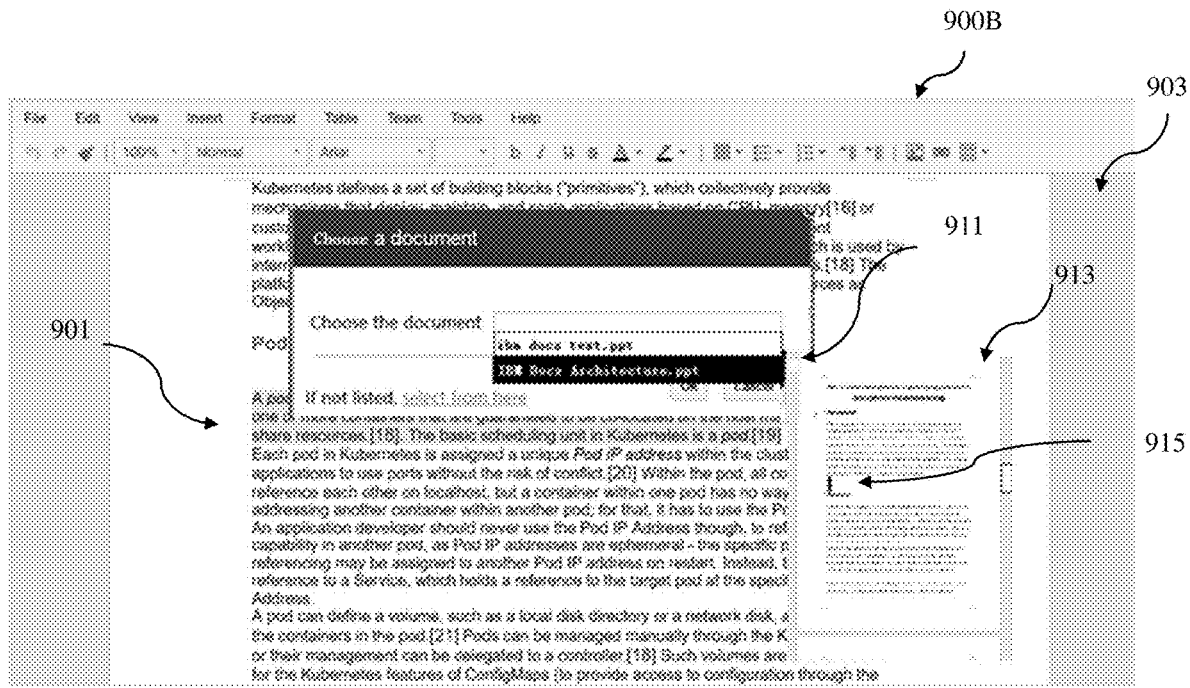
FIG. 9B depicts a follow up example user interface of "send to" function in accordance with some embodiments of the disclosure.

FIG. 9B depicts a follow up example user interface 900B providing "send to" function in accordance with some embodiments of the disclosure. Same numbers in FIGS. 9A and 9B represent the same items, which will not be further repeated here. Once "send to" function is triggered by the user, a follow up window (i.e., the window entitled "choose a document") 911 may pop up, which may show a list of documents for the user to select. Once the user selects a document, another window 913 may pop up with the recommended target segment 915 represented by where the cursor stays for the user to confirm whether this target segment is the object of "send to" function.

FIG. 6B depicts another flowchart 600B for providing at least one recommended target segment for copying from a source segment in accordance with some embodiments of the disclosure. Same number in FIGS. 6A and 6B represent the same or equivalent operations, which will not be repeated here. At operation 617, user feedback responsive to the at least one recommended target segment may be received by, for example, computer system/server 12 in FIG. 1. At operation 621, at least one of the following may be updated based on the user feedback: the at least one target segment token and the at least one source segment token. The operation 621 may be performed by, for example, computer system/server 12 in FIG. 1. For example, if the target segment finally confirmed by the user includes an additional key word that is also present in the context of the source segment, the additional key word may be updated to source segment tokens. Similarly, target segment tokens may also be updated accordingly. At operation 623, the at least one criterion for the metadata correlation may be updated based on the user feedback. Operation 623 may be performed by, for example, computer system/server 12 in FIG. 1. It is to be noted that operation 621 and operation 623 may be executed in serial or in parallel, or separately depending on business needs, and the order illustrated in FIG. 6B does not suggest and limitation to this disclosure.

It should be noted that a method, system, and/or computer program product for copy/paste recommendation according to embodiments of this disclosure may be implemented by computer system/server 12 of FIG. 1.

The disclosure may be embodied as a system, a method, and/or a computer program product at any possible technical detail level of integration. The computer program product may include a computer readable storage medium (or media) having a computer readable program instructions thereon for causing a processor to carry out aspects of the disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosure may include assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a computer, or other programmable data processing apparatus to produce a machine, such that the instructions, which execute via the processor of the computer or other programmable data processing apparatus, may implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium, having instructions stored thereon, may comprise an article of manufacture including instructions that implement aspects of the functions, acts, and/or operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that instructions that execute on the computer, other programmable apparatus, or other device implement the functions, acts, and/or operations specified in the flowchart and/or block diagram block or blocks.

The flowchart and block diagrams in the Figures illustrate the architecture, functionality, and operation of possible implementations of systems, methods, and computer program products according to some embodiments of the disclosure. In this regard, some block in the flowchart or block diagrams may represent a module, segment, or portion of instructions, which may comprise one or more executable instructions for implementing the specified logical function(s). In some alternative implementations, the functions described in the blocks and accompanying text may occur out of the order noted in the Figures. For example, two blocks shown in succession may be accomplished as one operation, executed concurrently, substantially concurrently, in a partially or wholly temporally overlapping manner, or the blocks may sometimes be executed in the reverse order, depending upon the functionality involved. It will also be noted that some blocks of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to help explain the principles of the embodiments, the practical application or technical improvement over technologies found in the marketplace, or to enable others of ordinary skill in the art to understand the embodiments disclosed herein.

What is claimed is:

1. A computer-implemented method for providing at least one source segment recommended for pasting to a target document, comprising:
   determining, by one or more processing units, a target content of a target segment in a target document;
   determining, by the one or more processing units, a correlation degree between the target content of the target segment and a source content of at least one source segment in at least one source document, wherein the correlation degree is determined at least partly based on context correlation between adjacent paragraphs of the target segment and each of the at least one source segment and at least partly based on metadata correlation between the target segment and each of the at least one source segment;
   wherein determining the correlation degree further comprises:
      determining, by the one or more processing units, at least one target segment metadata for the target segment;
      determining, by the one or more processing units, at least one source segment metadata for each of the at least one source segment;
      determining, by the one or more processing units, at least one criterion for the metadata correlation; and
      determining, by the one or more processing units, the metadata correlation between the target segment and each of the at least one source segment based on the at least one criterion, and comparison between the at least one target segment metadata and the at least one source segment metadata; and
   providing to a user, by the one or more processing units, at least one source segment recommended for pasting into the target document at the target segment, based on the correlation degree of the target content and the source content, for a user interface action.

2. The method of claim 1, wherein determining the correlation degree comprises:
   determining, by a natural language tool executing on the one or more processing units, at least one target segment token of the target segment;
   determining, by the natural language tool executing on the one or more processing units, at least one source segment token for each of the at least one source segment; and
   determining, by the one or more processing units, the context correlation between the target segment and each of the at least one source segment based on the at least one target segment token and the at least one source segment token.

3. The method of claim 2, further comprising:
   receiving, by the one or more processing units, user feedback to the at least one recommended source segment; and
   updating, by the one or more processing units, at least one token based on the user feedback chosen from the group consisting of the at least one source segment token and the at least one target segment token.

4. The method of claim 1, wherein the metadata is selected from the group consisting of an associated role, an associated timing, and an associated document type.

5. The method of claim 1, further comprising:
receiving, by the one or more processing units, user feedback to the at least one recommended source segment; and
updating, by the one or more processing units, the at least one criterion for the metadata correlation based on the user feedback.

6. The method of claim 1, further comprising:
receiving, by the one or more processing unites, a source document rule; and
selecting the source content using the source content rule.

7. The method of claim 1, wherein the user interface action is selected from the group consisting of a copy from action and a send to action.

8. The method of claim 1, further comprising combining the metadata correlation and the content correlation into a final correlation, wherein the correlation degree is based on the final correlation.

9. A computer program product, comprising a computer readable storage medium having program instructions embodied therewith, the program instructions being executable by a computer to cause the computer to perform a method for providing at least one source segment recommended for pasting to a target segment comprising:
determining a target content of a target segment in a target document;
determining a correlation degree between the target content of the target segment and a source content of at least one source segment in at least one source document, wherein the correlation degree is determined at least partly based on context correlation between adjacent paragraphs of the target segment and each of the at least one source segment and at least partly based on metadata correlation between the target segment and each of the at least one source segment;
wherein determining the correlation degree further comprises:
determining at least one target segment metadata for the target segment;
determining at least one source segment metadata for each of the at least one source segment;
determining at least one criterion for the metadata correlation; and
determining the metadata correlation between the target segment and each of the at least one source segment based on the at least one criterion, and comparison between the at least one target segment metadata and the at least one source segment metadata; and
providing to a user at least one recommended source segment from the at least one source segment, based on the correlation degree of the target segment and the source content, to be copied for pasting to the target segment.

10. The computer program product of claim 9, wherein the determining correlation degree comprises:
determining, using natural language processing, at least one target segment token of the target segment;
determining, using natural language processing, at least one source segment token for each of the at least one source segment; and
determining the context correlation between the target segment and each of the at least one source segment based on the at least one target segment token and the at least one source segment token.

11. The computer program product of claim 9, wherein the correlation degree is further determined at least partly based on metadata correlation between the target segment and each of the at least one source segment.

12. A computer-implemented method providing at least one recommended target segment for copying from a source segment, comprising:
determining, by one or more processing units, a source content of a source segment in a source document;
determining, by the one or more processing units, a correlation degree between the source content of the source segment and a target content of at least one target segment in at least one target document, wherein the correlation degree is determined at least partly based on context correlation between adjacent paragraphs of the target segment and each of the at least one source segment and at least partly based on metadata correlation between the source segment and each of the at least one target segment;
wherein determining the correlation degree further comprises:
determining, by the one or more processing units, at least one target segment metadata for the source segment;
determining, by the one or more processing units, at least one source segment metadata for each of the at least one target segment;
determining, by the one or more processing units, at least one criterion for the metadata correlation; and
determining, by the one or more processing units, the metadata correlation between the source segment and each of the at least one target segment based on the at least one criterion, and comparison between the at least one source segment metadata and the at least one target segment metadata; and
providing to a user, by the one or more processing units, at least one target segment from the at least one target segment recommended for receiving the source segment, based on the correlation degree of the target content and the source content, for a user interface copy for pasting action.

13. The method of claim 12, wherein determining the correlation degree comprises:
determining, by a natural language tool executing on the one or more processing units, at least one source segment token for the source segment;
determining, by the natural language tool executing on the one or more processing units, at least one target segment token for each of the at least one target segment; and
determining, by the one or more processing units, the context correlation between the source segment and each of the at least one target segment based on the at least one source segment token and the at least one target segment token.

14. The method of claim 13, further comprising:
receiving, by the one or more processing units, user feedback to the at least one recommended target segment; and
updating, by the one or more processing units, at least token based on the user feedback chosen from the group consisting of the at least one target segment token and the at least one source segment token.

15. The method of claim 12, wherein the metadata is selected from the group consisting of an associated role, an associated timing, and an associated document type.

16. The method of claim 12, further comprising:
receiving, by the one or more processing units, user feedback to the at least one recommended target segment; and
updating, by the one or more processing units, the at least one criterion for the metadata correlation based on the user feedback.

* * * * *